(12) United States Patent
Schäfer et al.

(10) Patent No.: US 6,200,613 B1
(45) Date of Patent: Mar. 13, 2001

(54) FOOD CASING

(75) Inventors: Ekkehardt Schäfer, Karlsruhe (DE); Tomoyoshi Nohmi, Kobe (JP)

(73) Assignee: Sun Products Marketing und Manufacturing AG, Balzers (LI)

( * ) Notice: Subject to any disclaimer, the term of this patent is extended or adjusted under 35 U.S.C. 154(b) by 0 days.

(21) Appl. No.: 09/415,285

(22) Filed: Oct. 8, 1999

Related U.S. Application Data

(63) Continuation-in-part of application No. 09/244,184, filed on Feb. 4, 1999, now abandoned.

(30) Foreign Application Priority Data

Oct. 8, 1998 (DE) ................................. 198 46 305

(51) Int. Cl.⁷ .............................. A23L 1/31; A23L 1/317; A23L 1/27; B65D 81/34
(52) U.S. Cl. .......................... 426/105; 426/135; 426/127; 426/250; 428/34.8; 428/36.1
(58) Field of Search ..................... 426/105, 135, 426/140, 92, 113, 127, 129, 130, 250, 297, 533, 534, 540, 410, 415, 392, 412; 428/34.8, 36.1, 36.3, 35.6

(56) References Cited

U.S. PATENT DOCUMENTS

| | | | |
|---|---|---|---|
| 3,343,663 | * 9/1967 | Seidler | 426/126 |
| 4,397,337 | * 8/1983 | Porrmann et al. | 138/118.1 |
| 4,446,167 | 5/1984 | Smith et al. | 426/650 |
| 4,623,566 | * 11/1986 | Kastl et al. | 428/36 |
| 4,861,632 | * 8/1989 | Caggiano | 428/35.2 |
| 4,940,614 | * 7/1990 | Kastl et al. | 428/348 |
| 5,043,194 | * 8/1991 | Siebrecht et al. | 428/34.8 |
| 5,382,391 | * 1/1995 | Juhl et al. | 264/22 |
| 5,419,962 | * 5/1995 | Robertson et al. | 428/348 |
| 5,698,279 | * 12/1997 | Vicik | 428/34.8 |

FOREIGN PATENT DOCUMENTS

| | | |
|---|---|---|
| 1 504 982 | 8/1970 | (DE) . |
| 2 312 385 | 10/1974 | (DE) . |
| 30 29 028 A1 | 2/1982 | (DE) . |
| 33 33 387 A1 | 4/1985 | (DE) . |
| 39 30 834 A1 | 3/1991 | (DE) . |
| 40 01 131 A1 | 7/1991 | (DE) . |
| 41 23 745 A1 | 1/1993 | (DE) . |
| 41 41 924 A1 | 6/1993 | (DE) . |
| 42 20 957 A1 | 1/1994 | (DE) . |
| 44 17 244 A1 | 11/1994 | (DE) . |
| 295 16 517 U 1 | 2/1996 | (DE) . |
| 197 29 659 A1 | 12/1997 | (DE) . |
| 0 408 164 A2 | * 1/1991 | (EP) . |
| 9524835 A1 | * 9/1995 | (WO) . |
| 97/12758 | 4/1997 | (WO) . |
| 97/36798 | 10/1997 | (WO) . |
| 98/31731 | 7/1998 | (WO) . |

* cited by examiner

*Primary Examiner*—Milton Cano
*Assistant Examiner*—Sherry A. Dauerman
(74) *Attorney, Agent, or Firm*—Akin, Gump, Strauss, Hauer & Feld, L.L.P.

(57) ABSTRACT

A food barrier casing for enclosing foodstuffs to be boiled or cooked within the casing, in particular for cooking or simmering sausages, ham, pickled products, or soft cheese. The casing comprising an absorbent inner layer which is firmly connected to an impermeable foil, wherein the inner layer comprises fibers and is impregnated with coloring and/or flavoring agents in an amount sufficient to impart color and/or flavor to the foodstuff within the casing.

10 Claims, 1 Drawing Sheet

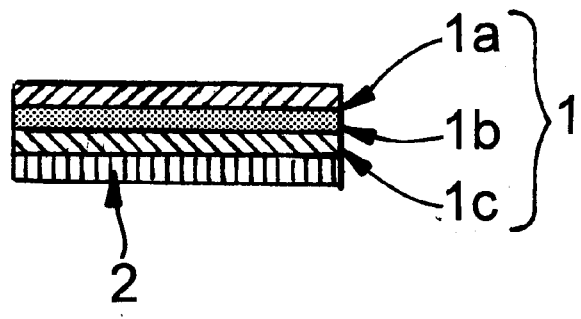
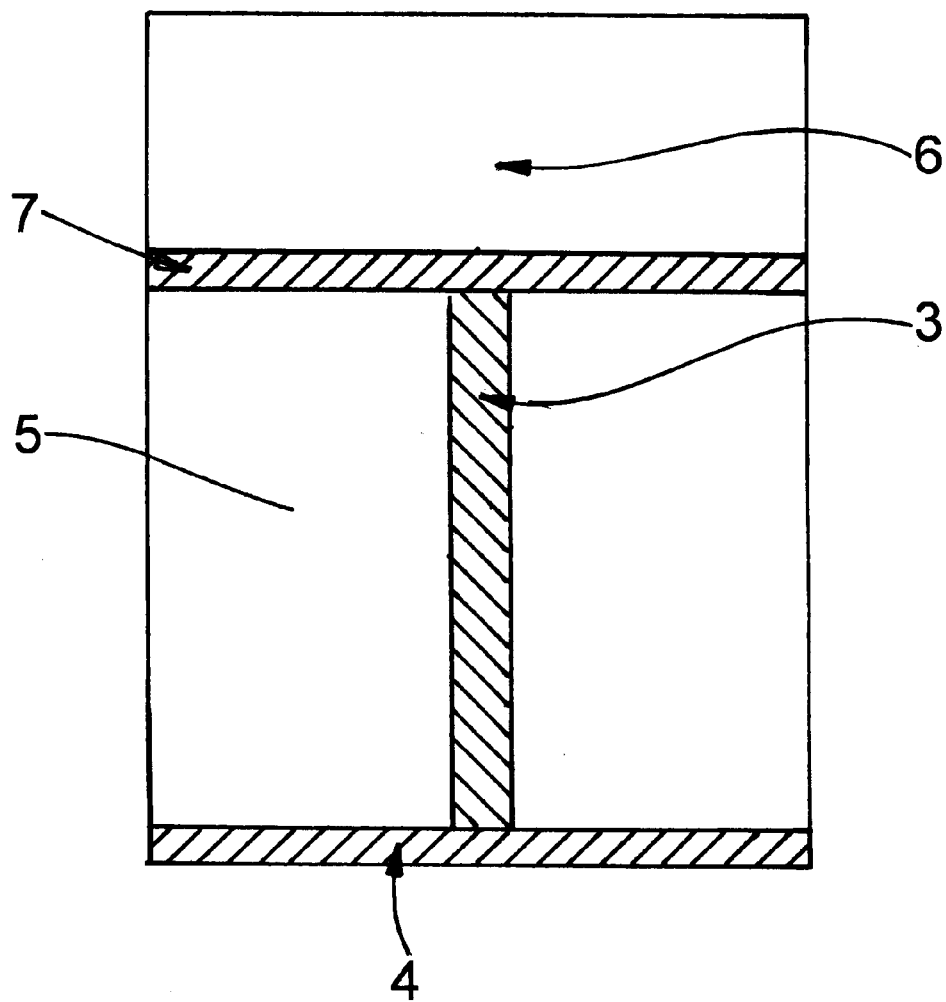

FOOD CASING

CROSS-REFERENCE TO RELATED APPLICATION

This is a continuation-in-part of U.S. application Ser. No. 09/244,184, filed Feb. 4, 1999, now abandoned which is incorporated herein by reference.

BACKGROUND OF THE INVENTION

The invention concerns a food barrier casing (or wrapping) for food which is boiled, cooked or otherwise heated in the casing, in particular for sausages to be cooked or simmered, ham, pickled products or soft cheese.

In food of this type, a color and/or flavor transfer from the casing to the food is increasingly desired during the cooking or simmering process.

Sausages to be simmered and pickled products to be cooked are still being produced to a large extent, in a more or less country-specific manner, in cellulose fiber casings. This cellulose fiber casing has a high steam and gas permeability in order to smoke the products during the production process.

It is also known to impregnate cellulose fiber casings with liquid smoke in order to shorten the smoking time.

However, due to the steam and gas permeability of the casing, the production of food in a cellulose fiber casing is always associated with a loss in weight, taste and flavor during the production process, during cooling and during storage.

Products produced in the cellulose fiber casing thus have a very short, limited shelf life and must be wrapped a second time as quickly as possible after production by means of a barrier casing to compensate for this disadvantage. A recontamination or reinfection which represents a loss in quality and shortening of shelf life can also not be ruled out with the additional casing and, moreover, involves additional costs.

To avoid the disadvantage of steam and gas permeability, plastic casings were developed, especially for big industry, comprising materials which have a steam and gas impermeability, so-called cook+ship, i.e. cooking and shipping without an additional second casing.

When using plastic casting of this type, there is no loss in weight, flavor and taste during the production process nor during storage and shipping, however, the finished product does not have the typical smoked taste which consumers desire and expect in many products.

The impregnation of pure plastic casings with flavors was also not successful since the plastics used cannot adequately absorb and store impregnating agents, and these are stripped off again during manufacture and when filling the plastic casings, since it cannot be absorbed and stored in a sufficient amount by the plastic layers.

In order to lend the product finished in the plastic casing the desired smoked taste and the typical color, the plastic casing must be removed after the production process and the product smoked in a conventional manner or processed with liquid smoke. In this subsequent process, there is again the possibility of a loss in weight, flavor and taste, in addition to the danger of recontamination and reinfection, and a second casing is again absolutely imperative after the processing.

SUMMARY OF THE INVENTION

Therefore, an object of the present invention is to provide a food barrier casing which exhibits, on the one hand, high density but, on the other hand, also good absorption power and storage capacity for the desired flavors and/or coloring agents and distinguishes itself by a later, sufficient transfer of these substances to the food product.

According to the present invention, this object is solved in that the casing comprises at least one steam and/or gas impermeable foil and has an absorbent inner layer connected therewith comprising individual fibers or a weave, fabric, knit, preferably a fleece, and that this inner layer is impregnated with coloring agents and/or flavoring agents.

First of all, this inner layer has the advantage of a high absorptivity and retainability for the colors and/or flavors. Moreover, tests by the applicant have shown that a substantially improved transfer of these substances to the food takes place during the subsequent cooking or boiling process compared to conventional casings, since the impermeability of the casing vis-à-vis steam, preferably also vis-à-vis gas, prevents the color or flavors from being washed out during the cooking process.

It was suprisingly shown that unusually thin wall thicknesses on the order of several hundredths mm to 1/10 mm are already sufficient for the inner layer to absorb the coloring and/or flavoring agents. For this reason, it is especially advantageous if the inner layer comprises individual fibers or a thin fleece. Cotton fibers, cellulose fibers, also regenerated cellulose fibers, viscose fibers or mixtures thereof are recommended as material herefor. An optimum storage capacity for the coloring or flavoring agents is attained thereby with little material inventory.

Advantageously, the inner layer is connected with the casing by lamination and/or coating, so that a one-piece easy-to-handle laminate is obtained. An adhesive can also be used for the connection. Extruded polyethylene in an almost liquid form is especially suitable as adhesive. The absorbent material of the inner layer is laminated to the inner side of the casing by means of this extruded polyethylene.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 1 is a cross section through the casing with an inner layer; and

FIG. 2 is a top view onto a casing in the form of a bag.

DETAILED DESCRIPTION OF THE INVENTION

According to FIG. 1, the casing, wrap or wrapper has a barrier casing 1 on the outside. It comprises two outer polyethylene layers 1a, 1c and an intermediate layer 1b of polyamide. The function of the barrier casing is to protect the food so as to be airtight and gastight, especially against steam and oxygen, so that the food is not washed out during the cooking or boiling process, i.e., it does not lose flavor or color. Advantageously, the barrier casing is shrinkable, for example a shrink foil which shrinks in a temperature range of about 70° C. to about 90° C., by means of which a crease-free end product results. Moreover, there is no loss in weight at all during the manufacturing process, storage and transport.

On its inner side, the described barrier casing 1 is coated with an absorbent inner layer 2, e.g., a fleece comprising cellulose fibers. It serves as a carrier for the desired coloring and/or flavoring agents. This could be caramel, aromatic extracts, smoke components, liquid smoke, marinades, fruit flavors and other substances allowed under the regulations governing food. They can be continuously applied to the absorbent inner layer 2 either by a spray tube, along which the casing shaped in the form of a tube is guided, or by a liquid bath along which the inner wall of the casing slides, or by means of a liquid bubble which is conveyed through the casing.

Instead of this, the inner layer 2 can also be imprinted with the desired coloring and/or flavoring agents in a flat form. After drying, the foil is given the tubular shape by means of a heat-sealable, heat-resistant adhesive tape or by heat-sealing at the overlapping edges.

The impregnated casing can be used and processed both in the wet and dry state. If the casing is to be dried after absorbing the coloring and/or flavoring agents through the absorbent inner layer, the use of colors and/or flavors which do not become volatile during drying is recommended.

All of the preceding material layers are laminated to form a film whereby, advantageously, an adhesive agent is used. Its overall thickness is generally less than 1/10 mm. Thus, the thickness of the two polyethylene layers 1a and 1c is 10 to 60 microns in each case, the thickness of the intermediate layer 1b comprising polyamide being 10 to 20 microns. The polyethylene layer Ic facing the food is advantageously extruded wet onto the layers 1a and 1b already joined together, so that it functions as an adhesive for the absorbent layer 2 to be subsequently applied.

For the inner layer 2, it is recommended that the absorbent material, i.e., the fleece, the fibers or the like, be applied in a material thickness of about 10 to about 30 g/m². This absorbing layer is then impregnated with the desired flavors or color carriers and produced, if necessary, in the form desired by the customer.

FIG. 2 shows the casing in the form of a bag. For this purpose, the casing is first given a tubular form and joined together at the overlapping longitudinal edges by a band 3 sealable under heat. This band 3 is at least heat-sealed with the layer 1a of the barrier casing 1.

At the lower end, the casing is sealed with a corresponding band 4, whereby the lower edge is, for example, folded over by 180° to ensure a tight heat-seal.

Special machines are required to attach the bands 3 and 4, and they are often not available to the manufacturer of the casing, i.e., the butcher's shop. For this reason, the bag 5 thus formed has an excess length 6 at its open upper edge which extends over the entire periphery and is connected with the bag by means of a sealable band 7. This excess length 6 does not have an absorbent inner layer 2 like the bag 5 but consists only of an easily heat-sealable plastic material, in particular polyethylene, which can be easily sealed by the customer to seal the bag 5 after it has been filled with the meat and evacuated.

TEST EXAMPLE

After the casing was impregnated with liquid smoke, a fine sausage emulsion was filled in, sealed by means of an aluminum clip and boiled. The casing or sausage filled in this way had a diameter of 80 mm.

The results were as follows:

| Control parameters Casing | Smoke taste | Loss in weight | Production time |
|---|---|---|---|
| smoked + boiled cellulose fiber casing | good | 8% | 100 min. |
| barrier casing with absorbent inner layer impregnated with smoke | very good | 0% | 60 min. |
| cellulose fiber casing impregnated with smoke | sufficient smoke taste | 5% | 80 min. |
| barrier casing without absorbent inner layer impregnated with smoke | no smoke taste can be ascertained | 0% | 60 min. |

TEST RESULTS

In summary, the invention offers the advantage that the flavor and/or the color, etc. is maintained on the inner side of the casing in high doses, is not lost when the casing is gathered and filled, and is reliably transferred to the food contained therein during the cooking or boiling process. Since the outer layers of the casing are impermeable, the substances cannot be rinsed out during the boiling process. No losses in weight, taste and flavor result during the production and boiling process or during transport and storage, and the production time remains short. The product can be delivered directly to the end user without a second casing.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A food barrier casing for enclosing a foodstuff to be boiled cooked or otherwise heated in the casing and for imparting a color and/or flavor to the foodstuff, wherein the casing comprises at least one steam and/or gas impermeable plastic foil (1), and an absorbent inner layer (2) joined to an inner side of the impermeable plastic foil (1), the inner layer (2) comprising fibers selected from the group consisting of woven fibers, fabric, knits, and fleece, and wherein the inner layer (2) is impregnated with coloring and/or flavoring agents in an amount sufficient to impart color and/or flavor to the foodstuff when the food barrier casing encloses the foodstuff.

2. The barrier casing according to claim 1, wherein the inner layer (2) comprises fibers selected from the group consisting of cotton fibers, cellulose fibers, regenerated cellulose fibers, viscose fibers, and mixtures thereof.

3. The barrier casing according to claim 1, wherein the impermeable plastic foil comprises a shrink foil which shrinks in a temperature range of about 70° C. to about 90° C.

4. The barrier casing according to claim 1, wherein the casing (1) is coated with the absorbent inner layer (2) to form a laminate.

5. The barrier casing according to claim 1, wherein the impermeable plastic foil has the shape of a bag (5) and an excess length (6) at an open end of the bag, said excess length being made without an absorbent inner layer and comprising a heat-sealable plastic foil.

6. The barrier casing according to claim 1, wherein the impermeable plastic foil (1) comprises on the inner side a layer (1c) having an inner surface to which the inner layer (2) is joined by an adhesive.

7. The barrier casing according to claim 6, wherein the adhesive comprises extruded polyethylene.

8. The barrier casing according to claim 1, wherein the impermeable plastic foil (1) comprises at least two foils laminated together and selected from the group consisting of polyethylene foil and polyamide foil.

9. The food barrier casing according to claim 1, wherein the impermeable plastic foil (1) comprises two polyethylene foils (1a, 1c) and a polyamide foil (1b) between them, wherein the inner side of the impermeable plastic foil (1) comprises one of the polyethylene foils (1c) extruded on wet which functions as an adhesive for joining the absorbent inner layer (2) subsequently applied.

10. The barrier casing according to claim 1, wherein the casing encloses a foodstuff selected from the group consisting of cooking sausages, simmering sausages, ham, pickled products, and soft cheeses.

* * * * *

(12) EX PARTE REEXAMINATION CERTIFICATE (8950th)
United States Patent
Schäfer et al.

(10) Number: US 6,200,613 C1
(45) Certificate Issued: Apr. 10, 2012

(54) FOOD CASING

(75) Inventors: Ekkehardt Schäfer, Karlsruhe (DE); Tomoyoshi Nohmi, Kobe (JP)

(73) Assignee: World PAC International USA, Inc., Sturtevant, WI (US)

Reexamination Request:
No. 90/011,566, Mar. 23, 2011

Reexamination Certificate for:
Patent No.: 6,200,613
Issued: Mar. 13, 2001
Appl. No.: 09/415,285
Filed: Oct. 8, 1999

Related U.S. Application Data

(63) Continuation-in-part of application No. 09/244,184, filed on Feb. 4, 1999, now abandoned.

(30) Foreign Application Priority Data

Oct. 8, 1998 (DE) .......................................... 198 46 305

(51) Int. Cl.
*A22C 13/00* (2006.01)
*B65D 81/34* (2006.01)

(52) U.S. Cl. .................. 426/105; 426/127; 426/135; 426/250; 428/34.8; 428/36.1

(58) Field of Classification Search .................. None
See application file for complete search history.

(56) References Cited

To view the complete listing of prior art documents cited during the proceeding for Reexamination Control Number 90/011,566, please refer to the USPTO's public Patent Application Information Retrieval (PAIR) system under the Display References tab.

*Primary Examiner* — Elizabeth McKane

(57) ABSTRACT

A food barrier casing for enclosing foodstuffs to be boiled or cooked within the casing, in particular for cooking or simmering sausages, ham, pickled products, or soft cheese. The casing comprising an absorbent inner layer which is firmly connected to an impermeable foil, wherein the inner layer comprises fibers and is impregnated with coloring and/or flavoring agents in an amount sufficient to impart color and/or flavor to the foodstuff within the casing.

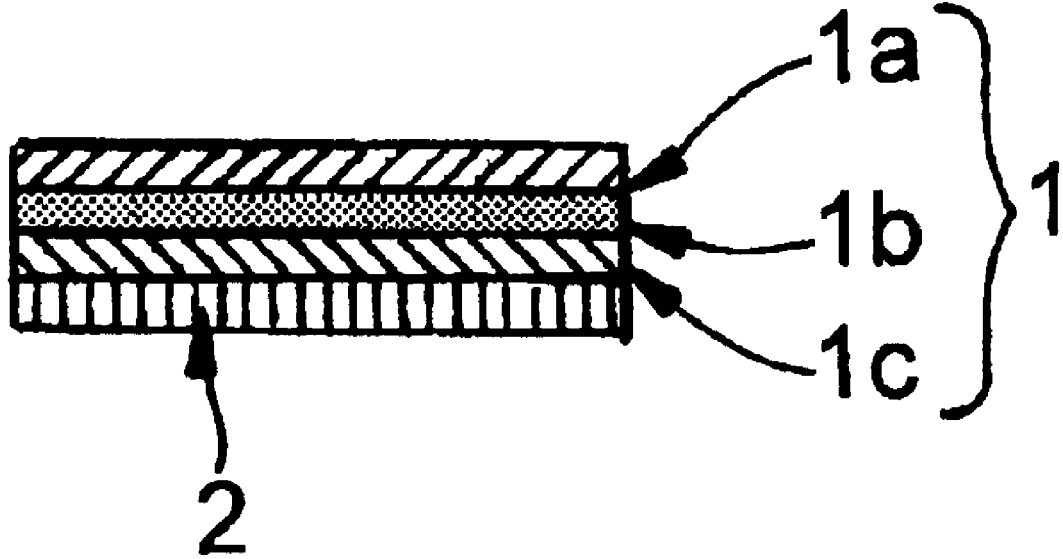

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 is confirmed.

New claims 11-23 are added and determined to be patentable.

*11. A food barrier casing for enclosing a foodstuff to be boiled cooked or otherwise heated in the casing and for imparting a color and/or flavor to the foodstuff, wherein the casing comprises at least one steam and/or gas impermeable plastic foil, and an absorbent inner layer joined to an inner side of the impermeable plastic foil, the inner layer comprising fibers selected from the group consisting of woven fibers, fabric, knits, and fleece, wherein the inner layer is impregnated with coloring and/or flavoring agents in an amount sufficient to impart color and/or flavor to the foodstuff when the food barrier casing encloses the foodstuff, wherein the impermeable plastic foil comprises on the inner side a layer having an inner surface to which the inner layer is joined by an adhesive, and wherein the impermeable plastic foil comprises at least two foils laminated together and selected from the group consisting of polyethylene foil and polyamide foil.*

*12. The barrier casing according to claim 11, wherein the adhesive comprises extruded polyethylene.*

*13. The barrier casing according to claim 11, wherein the impermeable foil comprises a shrink foil which shrinks in a temperature range of about 70° C. to about 90° C.*

*14. The barrier casing according to claim 11, wherein one of the at least two foils is impermeable to steam and another of the at least two foils is impermeable to gas.*

*15. The barrier casing according to claim 14, wherein the gas is oxygen.*

*16. The barrier casing according to claim 11, wherein an outer of the at least two foils comprises polyethylene foil and an inner of the at least two foils comprises polyamide foil.*

*17. The barrier casing according to claim 11, wherein the fibers of the inner layer comprise cellulose fibers.*

*18. The barrier casing according to claim 11, wherein the coloring and/or flavoring agents comprise liquid smoke.*

*19. The barrier casing according to claim 11, wherein the coloring and/or flavoring agents comprise caramel.*

*20. A food barrier casing for enclosing a foodstuff to be boiled cooked or otherwise heated in the casing and for imparting a color and/or flavor to the foodstuff, wherein the casing comprises at least one steam and/or gas impermeable plastic foil, and an absorbent inner layer joined to an inner side of the impermeable plastic foil, the inner layer comprising fibers selected from the group consisting of woven fibers, fabric, knits, and fleece, wherein the inner layer is impregnated with coloring and/or flavoring agents in an amount sufficient to impart color and/or flavor to the foodstuff when the food barrier casing encloses the foodstuff, and wherein the at least one impermeable plastic foil is impermeable to both steam and gas.*

*21. The barrier casing according to claim 20, wherein the at least one impermeable plastic foil comprises at least two foils laminated together, one of the at least two foils being impermeable to steam and another of the at least two foils being impermeable to gas.*

*22. The barrier casing according to claim 20, wherein the gas is oxygen.*

*23. The barrier casing according to claim 20, wherein the fibers of the inner layer comprise cellulose fibers.*

\* \* \* \* \*